United States Patent Office 3,514,295
Patented May 26, 1970

3,514,295
PROCESS FOR PREPARING A BASE FOR BAKING DARK BREADS
John Hauk, Glendale, N.Y., assignor to Hamale Process Corporation, New York, N.Y., a corporation of New York
No Drawing. Filed Dec. 26, 1967, Ser. No. 693,188
Int. Cl. A21d 8/02
U.S. Cl. 99—90  3 Claims

ABSTRACT OF THE DISCLOSURE

A process for preparing a base for baking dark breads such as pumpernickel, datenut bread, Boston bread and the like by a natural process without the use of any chemical additives. Wheat or rye flour is mixed with water and heated to predetermined temperatures for specified times, to prepare the initial base for the dough.

BACKGROUND OF THE INVENTION

So called "dark" breads, particularly pumpernickel, datenut bread, Boston brown bread and similar breads contain darkening substances in the form of molasses, caramel and other substances.

These substances are added to the mix in order to provide the desired coloring, taste, aroma, slicing capability, and to prevent the bread from crumbling.

The employment of the above substances to attain the desired characteristics entails time and labor-consuming steps as well as substantial costs which add to the prices paid by the public.

Accordingly, the object of the present invention is to provide a method of making pumpernickel, datenut bread, Boston brown bread and similar dark breads without the use of molasses, caramel and similar substances.

Another object of the invention is to provide a method for the breads of the above character, which are characterized by an attractive brown coloring, pleasant taste, good aroma, slicing capability and which will not crumble.

Yet, another object of the invention is to provide a method for, and breads of the above character at a substantial saving of time, labor and cost.

These and other objects of the invention will be described in the following.

It is to be understood, however, that these are given by way of illustration only and not of limitation and that various changes in particulars may be made within the scope thereof without departing from the inventive concept.

In carrying the process according to the invention, it is preferable to use a double mantle steam kettle, although other appropriate means may be employed.

The process is carried out as follows:

35 kilograms of dark fluor, such as wheat, rye and the like are added to 65 liters of water in a double mantle steam kettle. The water is heated to 100° F. The fluor and water are then mixed for 1½ to 2 hrs. while the temperature of the mix is gradually increased to 160° F.

After the mixing is discontinued, the mixture is left standing in the kettle for 3 hours while maintaining the 160° F. temperature.

At the expiration of 3 hours, as above, the mixture is gradually heated to 175° F. and left standing in the kettle for 2 to 3 days at this temperature.

In order to maintain this temperature uniform throughout the mixture, the latter is agitated every 3 or 4 hours for 20 minutes. If desired, 1% of malt may be added to the mixture.

At the end of 2 to 3 days the mixture forms a base of a desired coloring and is added to a rye or wheat dough prepared by known fermentation processes. A preferable proportion of the base to the dough is 3 parts of the base and 2 parts of dough.

The baking of the bread proper may be carried by any of the known processes.

It is advantageous to leave about ¼ of the base thus prepared in the kettle and to further add to it the cuttings of the baked bread for use as a base with a following batch of fermented dough.

It is important, while forming the base to raise the temperature gradually to allow the sugar in the rye or wheat flour to break down into individual components, otherwise it would form into a starch.

It has been found that the dough prepared with the base according to the invention has a good proofing temperature and is not affected by room temperature fluctuations.

Due to the process employed in the preparation of the base according to the invention and considering the fact that flour contains from 60 to 70% starch, the starch or multiple sugar is changed through the diastase into melt sugar which provides a brown appearance as well as a sweet taste to the base. The pumpernickel and the various dark breads prepared with this base are characterized by a pleasant taste, good firmness when sliced, an aromatic scent and freedom from crumbling.

The invention having thus been described, what is claimed and desired to be protected by Letters Patent of the United States is:

1. The process of preparing a base for dough comprising adding 35 kg. of dark flour, 65 liters of water, which has been heated to 100° F., gradually increasing the temperature of the water to 160° F. over a period from 1½ to 2 hours while continuously mixing the flour and water, discontinuing the mixing after said period, leaving the mixture stand for 3 hours while maintaining it at said temperature of 160° F., gradually heating the mixture to 175° F. and leaving it to stand for 24 to 72 hours, while agitating the mixture every 3 to 4 hours to maintain a uniform temperature therein.

2. The process according to claim 1, wherein said dark flour is rye.

3. The process according to claim 1, wherein said flour is wheat.

References Cited

UNITED STATES PATENTS

| | | | |
|---|---|---|---|
| 2,412,154 | 12/1946 | Jackson et al. | 99—90 |
| 2,478,099 | 8/1949 | Hennessy | 99—90 |

LIONEL M. SHAPIRO, Primary Examiner

J. R. HOFFMAN, Assistant Examiner